(12) United States Patent
Maeda

(10) Patent No.: US 8,342,303 B2
(45) Date of Patent: Jan. 1, 2013

(54) VALVE APPARATUS

(75) Inventor: Atsushi Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1027 days.

(21) Appl. No.: 11/878,271

(22) Filed: Jul. 23, 2007

(65) Prior Publication Data

US 2008/0023280 A1 Jan. 31, 2008

(30) Foreign Application Priority Data

Jul. 28, 2006 (JP) ................................. 2006-206391

(51) Int. Cl.
*F16F 9/34* (2006.01)
(52) U.S. Cl. ..................... 188/322.14; 188/315; 137/854
(58) Field of Classification Search ............... 188/282.5, 188/282.6, 322.13, 322.14, 322.15; 403/276, 403/279, 280, 281, 282; 137/854
See application file for complete search history.

(56) References Cited

U.S. PATENT DOCUMENTS

| | | | | |
|---|---|---|---|---|
| 3,844,389 | A * | 10/1974 | de Carbon | 188/322.15 |
| 3,958,673 | A * | 5/1976 | Allinquant et al. | 188/322.14 |
| 4,609,135 | A * | 9/1986 | Elliesen | 227/130 |
| 4,815,576 | A * | 3/1989 | Tanaka | 188/315 |
| 4,899,855 | A * | 2/1990 | de Carbon | 188/282.6 |
| 5,042,624 | A * | 8/1991 | Furuya et al. | 188/280 |
| 5,207,774 | A * | 5/1993 | Wolfe et al. | 137/625.32 |
| 5,529,154 | A * | 6/1996 | Tanaka | 188/282.6 |
| 5,577,579 | A * | 11/1996 | Derr | 188/315 |
| 6,230,858 | B1 * | 5/2001 | Moradmand et al. | 188/322.13 |
| 7,311,119 | B2 * | 12/2007 | Takehana et al. | 137/854 |

FOREIGN PATENT DOCUMENTS

| | | | |
|---|---|---|---|
| DE | 4139746 A1 | * | 6/1993 |
| JP | 62-25343 | | 2/1987 |
| JP | 62-107131 | | 7/1987 |
| JP | 1-135906 | | 5/1989 |
| JP | 7-19639 | | 4/1995 |
| JP | 7-22146 | | 4/1995 |
| JP | 2003-254374 | | 9/2003 |
| JP | 2008-051340 | | 3/2008 |

OTHER PUBLICATIONS

Japanese Office Action issued Jul. 13, 2011 in Japanese Application No. 2007-192273 which is a foreign counterpart of the present application.
Japanese Office Action issued Sep. 19, 2012 in Japanese Patent Application No. 2011-198490 with English translation.

* cited by examiner

*Primary Examiner* — Robert A Siconolfi
*Assistant Examiner* — Stephen Bowes
(74) *Attorney, Agent, or Firm* — Wenderoth, Lind & Ponack, L.L.P.

(57) ABSTRACT

A check valve, a retainer and a washer are secured to a valve body by inserting a pin therethrough and staking a distal end portion of the pin to form a staked portion. A restraining member is interposed between the washer and the staked portion. The fit clearance between the restraining member and the shank of the pin is set smaller than the fit clearance between the check valve, the retainer and the washer on the one hand and the shank of the pin on the other. Thus, when the distal end portion of the pin is staked, the deformation of the shank of the pin is restrained by the restraining member that defines a small clearance between the same and the pin. Therefore, it is possible to suppress the enlargement in diameter of a portion of the pin where the check valve is fitted and hence possible to prevent deformation of the check valve. Thus, stable valve characteristics can be obtained.

18 Claims, 6 Drawing Sheets

Rate of Change (%)

Number of times of pressurization

VALVE APPARATUS

BACKGROUND OF THE INVENTION

The present invention relates to a valve apparatus and more particularly to a valve apparatus suitable for use in a base valve of a tube type hydraulic shock absorber, for example, in which a disk-shaped valve member is secured to a valve body by staking.

A dual tube hydraulic shock absorber attached to a suspension system of an automobile is disclosed, for example, in Japanese Patent Application Publication No. 2003-254374. The hydraulic shock absorber has a dual tube structure comprising a cylinder and an outer tube provided to surround the outer periphery of the cylinder. An annular reservoir is formed between the cylinder and the outer tube. A piston is slidably fitted in the cylinder. The piston has a piston rod connected thereto to form a piston assembly. A base valve is provided at the lower end of the cylinder to divide between the interior of the cylinder and the reservoir. The cylinder has a hydraulic fluid sealed therein. The reservoir has the hydraulic fluid and gas sealed therein. The piston assembly and the base valve are provided with damping force generating mechanisms each including an orifice, a disk valve, etc. The flow of hydraulic fluid induced by the sliding movement of the piston in the cylinder is controlled by the damping force generating mechanisms, thereby generating damping force. In addition, the hydraulic fluid is exchanged between the cylinder and the reservoir through the base valve, thereby compensating for a volumetric change in the cylinder due to the piston rod entry into and withdrawal from the cylinder.

An example of the structure of a base valve of such a dual tube hydraulic shock absorber will be explained below with reference to FIG. 10. As shown in FIG. 10, a base valve has a valve body 2 that is secured to the lower end of a cylinder (not shown) to divide between a cylinder chamber C and a reservoir R. The valve body 2 has extension hydraulic fluid passages 3 and compression hydraulic fluid passages 4 axially extending therethrough for communication between the cylinder chamber C and the reservoir R. A check valve 5 (disk valve) is secured to the upper end of the valve body 2 to allow only the flow of hydraulic fluid through the extension hydraulic fluid passages 3 from the reservoir R to the cylinder chamber C. A disk valve 6 is secured to the lower end of the valve body 2 to control the flow of hydraulic fluid through the compression hydraulic fluid passages 4 from the cylinder chamber C to the reservoir R, thereby generating damping force.

The check valve 5 and the disk valve 6 are secured, together with retainers 7 and 8 and washers 9 and 10, to the valve body 2 with a pin 12 inserted through an opening 11 in the center of the valve body 2. The pin 12 has at the lower end thereof a flange portion 13 that abuts against the washer 10. The pin 12 is inserted through the valve body 2, the check valve 5, the disk valve 6, the retainers 7 and 8 and the washers 9 and 10, and a distal end portion thereof is staked to form a staked portion 14, thereby securing together these members as one unit.

The distal end of the pin 12 can be deformed to form the staked portion 14, for example, by an orbital (Taumel) staking process wherein a tilted punch is pressed against the distal end of the pin 12 while being revolved on a predetermined orbit, thereby forming a rivet head continuously. Thus, it is possible to form the staked portion 14 efficiently with a low load while preventing frictional heat generation.

The following problems, however, are experienced with the valve apparatus of the above-described related art in which the check valve 5, the disk valve 6 and so forth are secured to the valve body 2 by staking the pin 12. When the staked portion 14 is formed at the distal end of the pin 12, as shown in FIG. 11, radial strains occur near the staked portion 14, causing the pin 12 to slightly increase in diameter. Consequently, the shank of the pin 12 has its diameter increased from the original diameter A as follows. A portion of the shank of the pin 12 nearest to the staked portion 14 has the largest diameter B. The diameter gradually decreases as the distance from the staked portion 14 increases, but the diameter C of a portion of the pin shank where the check valve 5 is fitted is still slightly larger than the original diameter A.

Accordingly, the inner diameter of the check valve 5 is forcedly enlarged by the enlarged diameter shank of the pin 12, and this induces wavy deformation on the surface of the check valve 5. The deformation causes the valve opening characteristics of the check valve 5 to become unstable and also degrades sealing performance, resulting in the hydraulic shock absorber failing to provide stable damping force. FIG. 8A shows a measuring result of the amount of deformation D at the outer peripheral portion of the check valve 5. It will be understood from FIG. 8A that there are two peaks of deformation D at two diametrically opposing portions of the check valve 5, and this causes the sealing performance to be degraded. Curve (A) in FIG. 9 shows the rate of change of pressure in the upper chamber (cylinder chamber C) with respect to the number of times of pressurization when the upper chamber and the lower chamber (reservoir R) divided by the base valve were repeatedly pressurized at a pressure corresponding to a piston speed of 0.1 m/sec. It can be seen from curve (A) in FIG. 9 that there is a pressure change of about 19% after 200 times of pressurization, i.e. the change of valve opening characteristics with time is large, and thus the valve characteristics are unstable.

SUMMARY OF THE INVENTION

The present invention has been made in view of the above-described circumstances. Accordingly, an object of the present invention is to provide a valve apparatus capable of preventing the deformation of a valve member due to staking and thereby obtaining stable valve characteristics.

The present invention provides a valve apparatus including a valve body having a hydraulic fluid passage and at least one disk-shaped valve member that selectively opens and closes the hydraulic fluid passage. The valve apparatus further includes a pin inserted through the valve body and the valve member. The pin has a staked portion formed by staking a distal end portion thereof to secure the valve body and the valve member to the pin. At least one ring-shaped restraining member is provided between the valve member and the staked portion. The pin extends through the restraining member. The fit clearance between the restraining member and the pin is smaller than the fit clearance between the valve member and the pin.

In addition, the present invention provides a hydraulic shock absorber including a cylinder having a hydraulic fluid sealed therein. An outer tube surrounds the outer periphery of the cylinder. A reservoir is formed between the cylinder and the outer tube. A piston is slidably fitted in the cylinder. A piston rod projects at one end thereof from one end of the cylinder and is fixedly secured at the other end thereof to the piston. A valve body is provided at the other end of the cylinder to divide between the interior of the cylinder and the reservoir. The valve body has a hydraulic fluid passage communicating between the interior of the cylinder and the reservoir. At least one disk-shaped valve member is provided on a side of the valve body inside the cylinder to selectively open and close the hydraulic fluid passage. The hydraulic shock absorber further includes a pin inserted through the valve body and the valve member. The pin has a staked portion formed by staking a distal end portion thereof that is to be located inside the cylinder to secure the valve body and the valve member to the pin. At least one ring-shaped restraining member is provided between the valve member and the staked portion. The pin extends through the restraining member. The fit clearance between the restraining member and the pin is smaller than the fit clearance between the valve member and the pin.

DETAILED DESCRIPTION OF THE PREFERRED EMBODIMENTS

Figure 10:
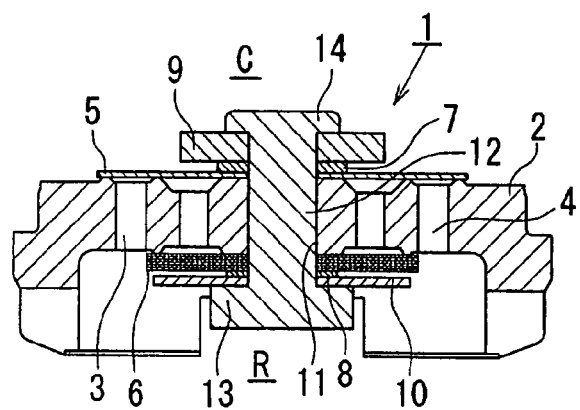
FIG. 10 is a vertical sectional view of a base valve according to a related art.

A first embodiment of the present invention will be described below in detail with reference to the accompanying drawings. It should be noted that members or portions of the embodiment similar to those of the related art shown in FIG. 10 are denoted by the same reference numerals as used in the related art.

Figure 1:
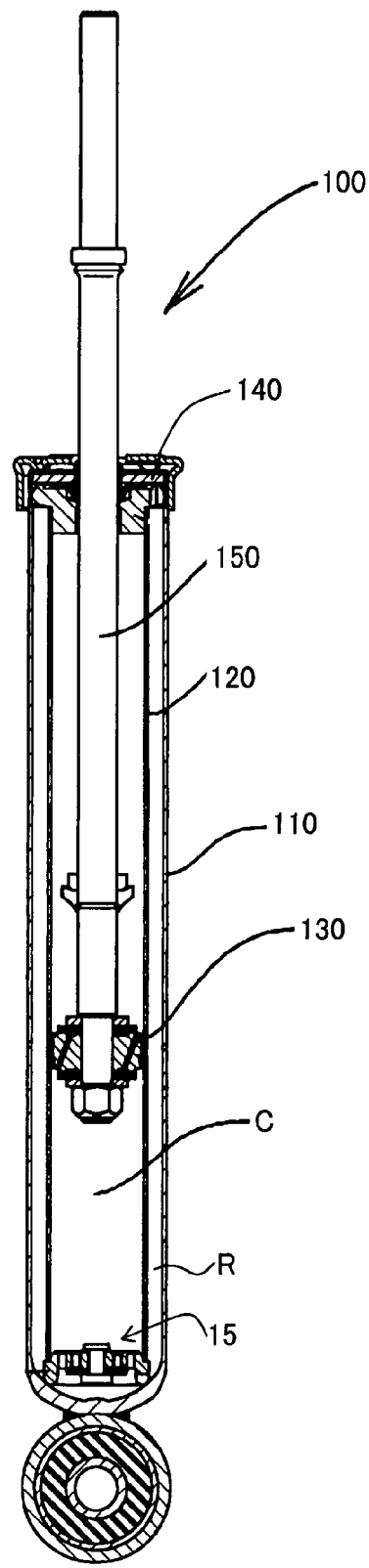
FIG. 1 is a vertical sectional view showing the general structure of a dual tube hydraulic shock absorber using as a base valve a valve apparatus according to a first embodiment of the present invention.

FIG. 1 illustrates the general structure of a dual tube hydraulic shock absorber 100 having a base valve incorporating the valve apparatus according to the present invention.

A cylinder 120 is coaxially provided in an outer tube 110 to define a reservoir R therebetween. A cylinder chamber C formed in the cylinder 120 has a hydraulic fluid sealed therein. The reservoir R between the outer tube 110 and the cylinder 120 has a gas and hydraulic fluid sealed therein.

A piston 130 with damping valves is slidably provided in the cylinder 120. The piston 130 has a piston rod 150 secured thereto. The piston rod 150 extends through a seal member 140 that closes respective openings of the cylinder 120 and the outer tube 110.

Figure 2:
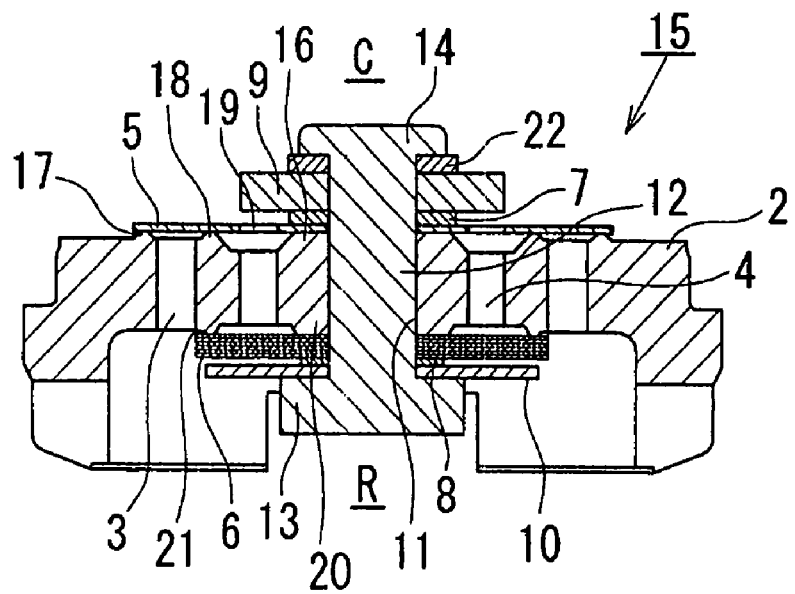
FIG. 2 is a vertical sectional view of the base valve incorporating the valve apparatus according to the first embodiment of the present invention.

A base valve 15 incorporating a valve apparatus according to a first embodiment of the present invention is provided at the lower end of the cylinder 120. The base valve 15 will be detailed below with reference to FIG. 2.

The base valve 15 has a configuration similar to that of the base valve shown in FIG. 10. Members or portions of the base valve 15 similar to those shown in FIG. 10 are denoted by the same reference numerals as those used in FIG. 10.

The base valve 15 is secured to the lower end of the cylinder 120 to divide the cylinder chamber C and the reservoir R from each other. The base valve 15 has a valve body 2 that is secured to the lower end of the cylinder 120 to divide between the cylinder chamber C and the reservoir R. The valve body 2 has a plurality of extension hydraulic fluid passages 3 (hydraulic fluid passage) and a plurality of compression hydraulic fluid passages 4 axially extending therethrough to communicate between the cylinder chamber C and the reservoir R. The extension hydraulic fluid passages 3 are disposed closer to the outer periphery of the valve body 2 and circumferentially equally spaced from each other. The compression hydraulic fluid passages 4 are disposed closer to the inner periphery of the valve body 2 and circumferentially equally spaced from each other.

Figure 3:
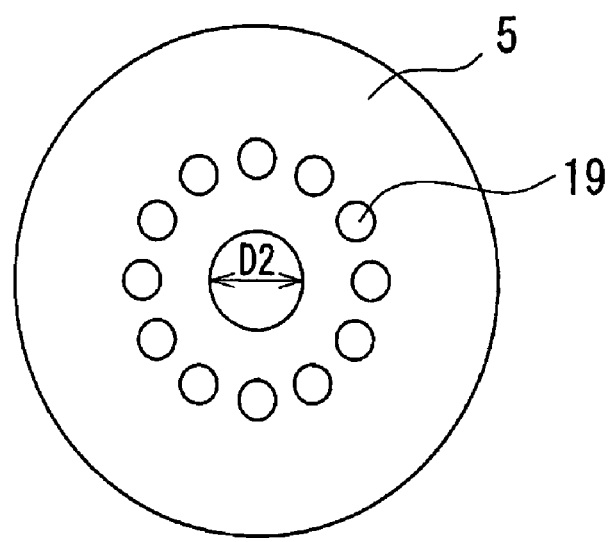
FIG. 3 is a plan view of a check valve in the base valve shown in FIG. 2.

The valve body 2 has an annular clamp portion 16 projecting from the upper end surface thereof at the outer peripheral edge of an opening 11 provided in the center of the valve body 2. The valve body 2 further has annular seat portions 17 and 18 projecting therefrom in concentric relation to the clamp portion 16 at respective positions facing each other across the extension hydraulic fluid passages 3, i.e. at the outer and inner peripheral sides, respectively, of the extension hydraulic fluid passages 3 (at the outer peripheral side of the compression hydraulic fluid passages 4). A disk-shaped check valve 5 (valve member) is secured to the upper end of the valve body 2 so as to seat on the seat portions 17 and 18. The check valve 5 is, as shown in FIG. 3, provided with a plurality of hydraulic fluid passages 19 for constantly communicating the compression hydraulic fluid passages 4 with the cylinder chamber C.

An annular clamp portion 20 projects from the lower end surface of the valve body 2 at the outer peripheral edge of the opening 11 in the center of the valve body 2. The valve body 2 further has an annular seat portion 21 projecting therefrom in concentric relation to the clamp portion 20 at the outer peripheral side of the compression hydraulic fluid passages 4 (i.e. the side thereof closer to the extension hydraulic fluid passages 3). A disk valve 6 comprising a stack of a plurality of disk valve elements is secured to the lower end of the valve body 2 so as to seat on the seat portion 21.

The check valve 5 and the disk valve 6 are secured to the valve body 2, together with ring-shaped retainers 7 and 8, washers 9 and 10 and a restraining member 22, with a pin 12 inserted through the opening 11 in the center of the valve body 2. The pin 12 has at the lower end thereof a flange portion 13 that abuts against the washer 10. The pin 12 is inserted through the valve body 2, the check valve 5, the disk valve 6, the retainers 7 and 8, the washers 9 and 10 and the restraining member 22, and a distal end portion thereof is deformed to form a staked portion 14, for example, by the above-described orbital (Taumel) staking process, thereby securing together these members as one unit. Thus, the check valve 5 is clamped at an inner peripheral portion thereof between the clamp portion 16 and the retainer 7. The outer peripheral portion of the check valve 5 seats on the seat portions 17 and 18, thereby allowing only the flow of hydraulic fluid in the extension hydraulic fluid passages 3 from the reservoir side to the cylinder chamber side. The disk valve 6 has an inner peripheral portion thereof clamped between the clamp portion 20 and the retainer 8. The outer peripheral portion of the disk valve 6 seats on the seat portion 21, thereby offering resistance to the flow of hydraulic fluid in the compression hydraulic fluid passages 4 from the cylinder chamber side to the reservoir side. The washers 9 and 10 limit the amounts of deflection of the check and disk valves 5 and 6, respectively, thereby preventing damage to the valves 5 and 6 due to an excessive deflection.

Figure 4:
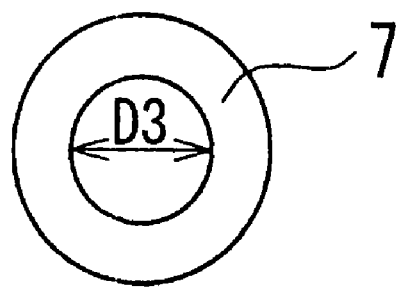
FIG. 4 is a plan view of a retainer in the base valve shown in FIG. 2.
Figure 5:
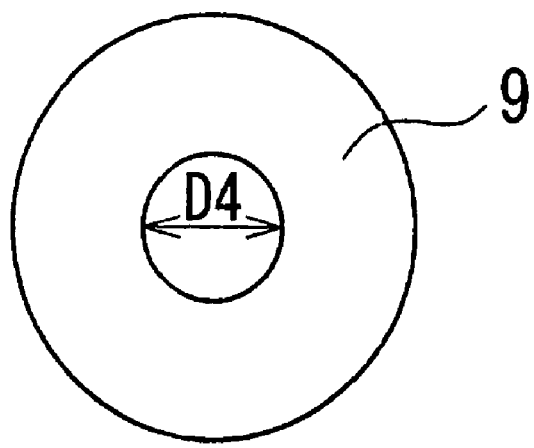
FIG. 5 is a plan view of a washer in the base valve shown in FIG. 2.
Figure 6:
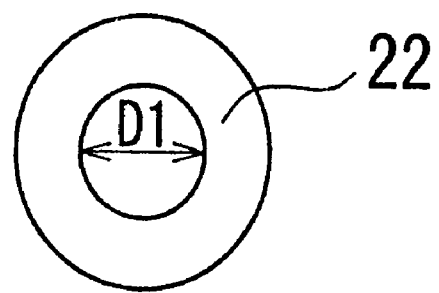
FIG. 6 is a plan view of a restraining member in the base valve shown in FIG. 2.

A ring-shaped restraining member 22 is interposed between the washer 9 and the staked portion 14. Fit tolerances for clearance fit with respect to the outer diameter of the pin 12 have previously been set for the check valve 5, the disk valve 6, the retainers 7 and 8, the washers 9 and 10, and the restraining member 22, which are secured to the valve body 2 with the pin 12, so that the pin 12 can be readily inserted through these members during assembling. In this regard, the inner diameter $D_1$ of the restraining member 22 (see FIG. 6) is smaller than the inner diameter $D_2$ of the check valve 5 (see FIG. 3), the inner diameter $D_3$ of the retainer 7 (see FIG. 4) and the inner diameter $D_4$ of the washer 9 (see FIG. 5) to provide a smaller fit clearance with respect to the shank of the pin 12 than those of the check valve 5, the retainer 7 and the washer 9. In this embodiment, the pin 12 has an outer diameter of 5 mm. The inner diameters $D_2$, $D_3$ and $D_4$ of the check valve 5, the retainer 7 and the washer 9 are about 5.12 mm, whereas the inner diameter $D_1$ of the restraining member 22 is about 5.05 mm. The restraining member 22 has sufficient rigidity so that it will not be deformed by the enlargement of diameter of the pin 12 when the pin 12 is subjected to staking to form the staked portion 14. Thus, the restraining member 22 restrains the pin 12 from increasing in diameter when the distal end portion of the pin 12 is staked to form the staked portion 14.

The following is a description of the operation of this embodiment arranged as stated above.

The base valve 15 is attached to the above-described dual tube hydraulic shock absorber. During the extension stroke of the piston rod 150, the check valve 5 opens to allow the hydraulic fluid to flow from the reservoir R to the cylinder chamber C through the extension hydraulic fluid passages 3, whereby an increase in volume in the cylinder 120 due to the withdrawal of the piston rod 150 is compensated for by the expansion of gas in the reservoir R. During the compression stroke of the piston rod 150, the check valve 5 is closed, whereas the disk valve 6 opens to allow the hydraulic fluid to flow from the cylinder chamber C to the reservoir R through the compression hydraulic fluid passages 4 with a proper flow resistance, whereby a reduction in volume in the cylinder 120 due to the entry of the piston rod 150 is compensated for by the compression of gas in the reservoir R, and the pressure in the cylinder chamber C above the piston 130 is prevented from becoming a negative pressure.

Figure 11:
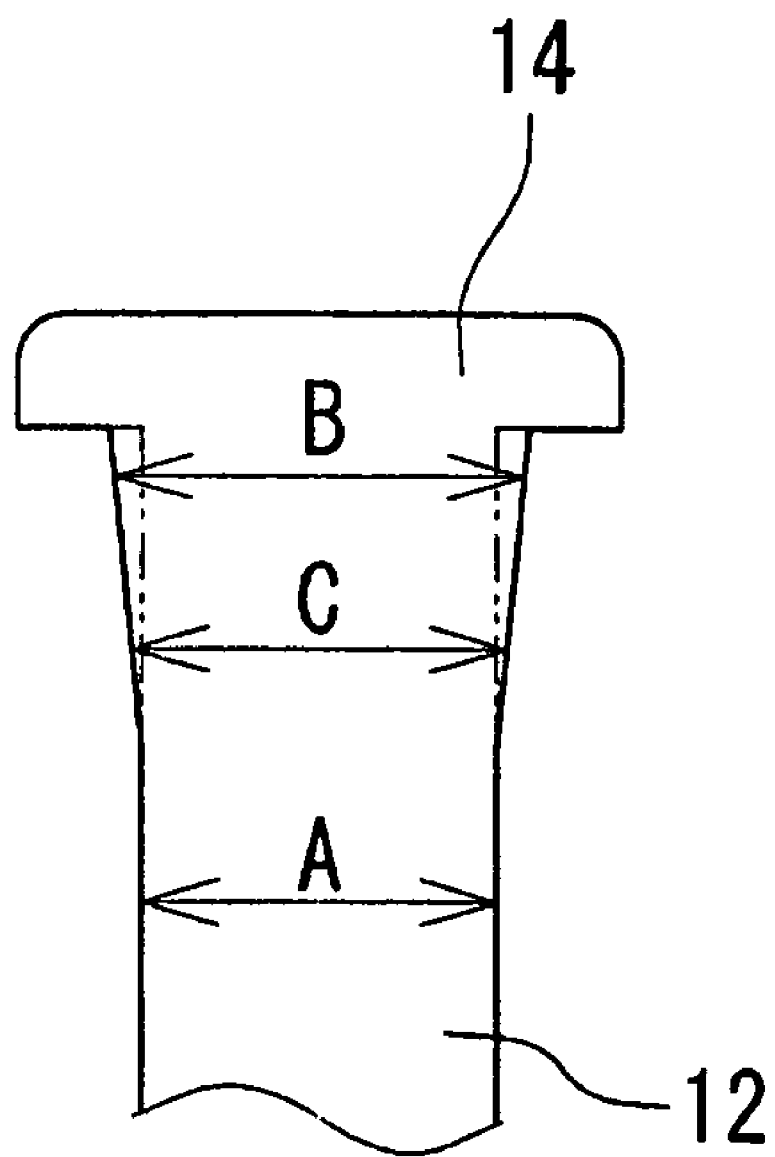
FIG. 11 is an explanatory view schematically showing the deformation of the shank of a pin due to staking in the base valve shown in FIG. 10.

In the manufacturing process of the base valve 15, when the distal end portion of the pin 12 is staked to form the staked portion 14, as shown in FIG. 11, the pin 12 is strained such that a pin shank portion near the staked portion 14 increases in diameter. Meanwhile, the restraining member 22 having a small fit clearance with respect to the pin 12 is disposed at a position adjacent to the staked portion 14. Therefore, the enlargement in diameter of the shank of the pin 12 is restrained by the inner diameter $D_1$ of the restraining member 22, and this suppresses the enlargement in diameter of the shank portion of the pin 12 that is fitted with the washer 9 (inner diameter $D_4>D_1$), the retainer 7 (inner diameter $D_3>D_1$) and the check valve 5 (inner diameter $D_2>D_1$), which are disposed below the restraining member 22. Thus, it is possible to prevent the occurrence of wavy deformation on the surface of the check valve 5 that would otherwise be induced when the inner diameter of the check valve 5 is forcedly enlarged by the diameter enlargement of the shank of the pin 12. Consequently, it is possible to prevent degradation of sealing performance due to such deformation and also prevent the valve characteristics from becoming unstable and hence possible to stabilize the damping force of the hydraulic shock absorber.

Figure 8:
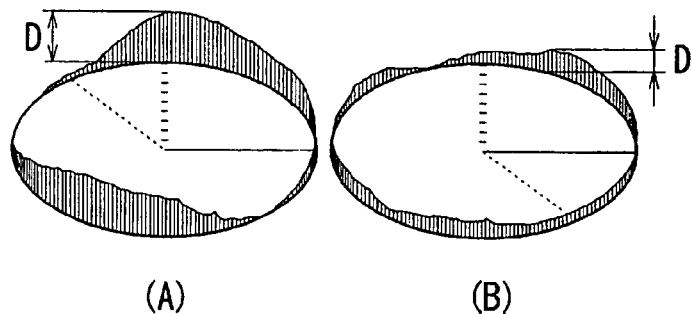
FIG. 8A is a chart showing the amount of deformation of a check valve in a base valve shown in FIG. 10 that is caused by staking of a pin.
FIG. 8B is a chart showing the amount of deformation of the check valve in the base valve shown in FIG. 2 that is caused by staking of a pin.
Figure 9:
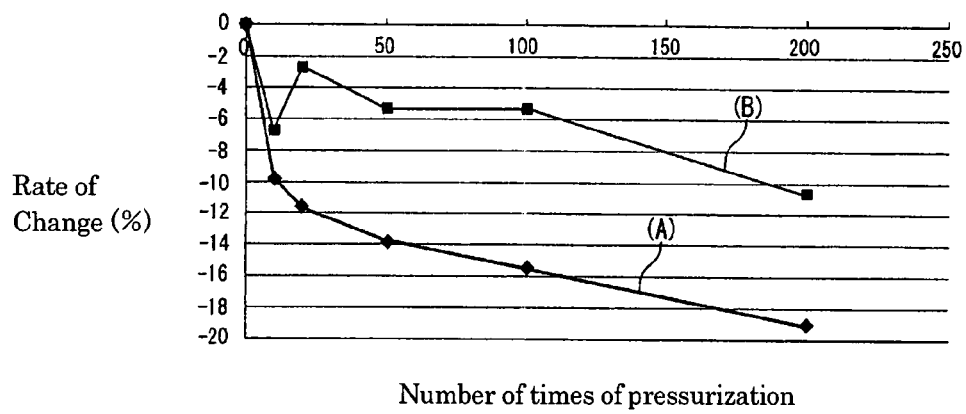
FIG. 9 is a graph showing the rate of change of pressure with respect to the number of times of pressurization when the base valve shown in FIG. 10 was repeatedly pressurized, and also showing the rate of change of pressure with respect to the number of times of pressurization when the base valve shown in FIG. 2 was repeatedly pressurized.

FIG. 8B shows a measuring result of the amount of deformation D at the outer peripheral portion of the check valve 5 in this embodiment. It will be understood from FIG. 8B that the deformation D is considerably smaller than in the related art shown in FIG. 8A. Curve (B) in FIG. 9 shows the rate of change of pressure in the upper chamber (cylinder chamber C) with respect to the number of times of pressurization when the upper chamber and the lower chamber (reservoir R) divided by the base valve 1 were repeatedly pressurized at a pressure corresponding to a piston speed of 0.1 m/sec. It can be seen from curve (B) in FIG. 9 that there is a pressure change of about 11% after 200 times of pressurization, i.e. the change of valve opening characteristics with time is small as compared with the related art shown by curve (A) in FIG. 9, and thus the valve characteristics are favorably stable.

It should be noted that the washer 9 is preferably made softer than the restraining member 22 and the retainer 7 by forming the washer 9 from a hot-rolled steel plate, for example, and the restraining member 22 and the retainer 7 from carbon steel having a Vickers hardness of 300 or higher, for example. By so doing, even if the portion of the pin 12 corresponding to the washer 9 increases in diameter in excess of the inner diameter of the washer 9, the washer 9 is favorably deformed to absorb the increase in diameter.

Although in the foregoing first embodiment the inner diameter $D_1$ of the restraining member 22 is about 5.05 mm for the outer diameter of 5 mm of the pin 12, the inner diameter $D_1$ may be set at 4.95 mm to press-fit the restraining member 22 to the pin 12. In this case, when the base valve 15 is to be assembled, the washer 10, the retainer 8, the disk valve 6, the valve body 2, the check valve 5, the retainer 7 and the washer 9 are fitted onto the pin 12 in the order mentioned, and thereafter, the restraining member 22 is press-fitted to the pin 12. By doing so, an axial force can be applied to each member that has already been fitted onto the pin 12, and in this state, the distal end of the pin 12 is staked. Thus, axial force variation can be minimized.

Figure 7:
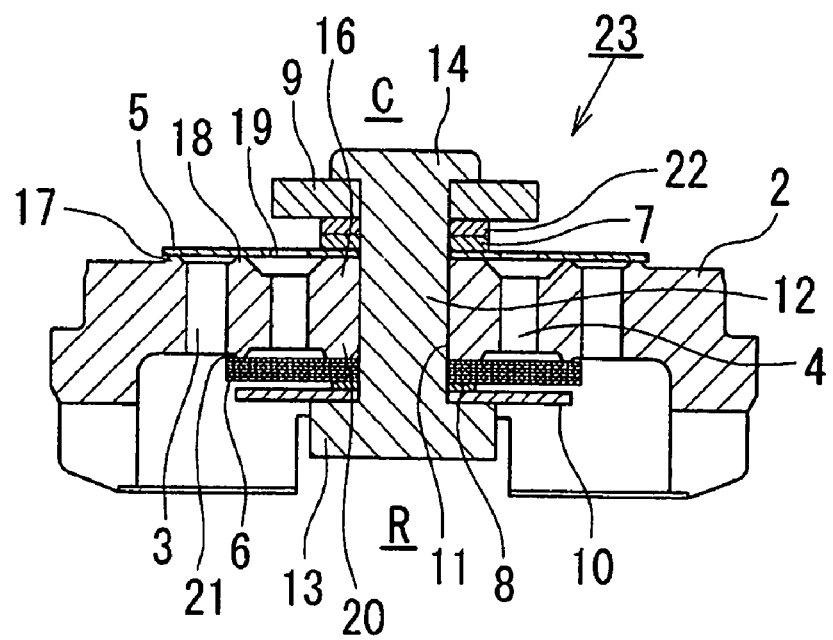
FIG. 7 is a vertical sectional view of a base valve incorporating a valve apparatus according to a second embodiment of the present invention.

Next, a second embodiment of the present invention will be described with reference to FIG. 7. It should be noted that members or portions of the second embodiment similar to those of the first embodiment are denoted by the same reference numerals as used in the first embodiment, and only a point in which the second embodiment differs from the first embodiment will be explained in detail.

In a base valve 23 incorporating the valve apparatus according to the second embodiment, the restraining member 22 is disposed between the retainer 7 and the washer 9 (ring-shaped member), and a predetermined clearance is provided between the washer 9 and the pin 12. With the arrangement in which the washer 9 having a clearance between the same and the pin 12 is disposed between the staked portion 14 and the restraining member 22, when the distal end portion of the pin 12 is staked to form the staked portion 14, the enlargement in diameter of the shank of the pin 12 is restrained by the restraining member 22, and the deformation of the shank is absorbed by the clearance formed between the pin 12 and the washer 9 disposed above the restraining member 22. Consequently, the inner diameter of the check valve 5 can be prevented from being forcedly enlarged. Thus, the second embodiment can offer advantageous effects similar to those of the foregoing first embodiment.

It should be noted that in this embodiment the restraining member 22 may be disposed between the check valve 5 and the retainer 7. In this case, the deformation of the shank of the pin 12 during staking is absorbed by the clearance between the retainer 7 and the washer 9 on the one hand and the pin 12 on the other. The restraining member 22 may be used also as a retainer instead of using the retainer 7.

In the first and second embodiments, the opening of the check valve 5 through which the pin 12 is inserted may be of a shape other than circular, for example, a regular hexagon that circumscribes the shank of the pin 12 with a predetermined fit tolerance. In this case, the check valve 5 can be accurately positioned by the six sides of the regular hexagonal opening that circumscribe the shank of the pin 12. The opening of the check valve 5 may be of other polygonal shapes, provided that the polygonal opening can position the check valve 5 by contacting the shank of the pin 12 at at least three points. The opening of the check valve 5 may also be of a shape in which opening portions contacting the shank of the pin 12 project inward, e.g. a star-shape. Further, the shank of the pin 12, the opening 11 of the valve body 2, and those of the check valve 5, the disk valve 6, the retainers 7 and 8, the washers 9 and 10 and the restraining member 22, through which the shank of the pin 12, is inserted need not necessarily be circular but may be of other shapes as long as these members can be positioned concentrically.

Although in the first and second embodiments the pin 12 has the flange portion 13 at the lower end thereof and the staked portion 14 formed at the upper end thereof, the flange portion 13 may be formed at the upper end of the pin 12, with the staked portion 14 formed at the lower end thereof. In this case, the restraining member 22 is disposed below the disk valve 6, whereby the disk valve 6 can be prevented from being deformed by the enlargement in diameter of the shank of the pin 12 due to staking.

Although in the first and second embodiments the present invention has been described with regard to an example in which the valve apparatus is applied to a base valve of a dual tube hydraulic shock absorber, the present invention is not necessarily limited thereto. The present invention is similarly applicable to other valve apparatus in which a disk-shaped valve member is secured to a valve body by staking of a pin. For separate hydraulic shock absorbers in which a gas spring constituting a reservoir is provided separately from a cylinder, for example, the present invention is applicable to a separate hydraulic shock absorber of the type in which a base valve is provided at the gas spring side.

According to the valve apparatus and hydraulic shock absorber of the above-described embodiments, when the distal end portion of the pin is staked, the deformation of the shank of the pin is restrained by the restraining member that defines a small fit clearance between the same and the pin. Therefore, it is possible to suppress the enlargement in diameter of the portion of the pin where the valve member is fitted and hence possible to prevent deformation of the valve member. Thus, stable valve characteristics can be obtained.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2006-206391 filed on Jul. 28, 2006 including specification, claims, drawings and summary is incorporated herein by reference in its entirety.

What is claimed is:

1. A valve apparatus comprising:
    a valve body having an opening and a hydraulic fluid passage spaced apart from the opening;
    at least one valve member comprising an annular disk that selectively opens and closes the hydraulic fluid passage, the valve member being provided at one end of the valve body;
    a pin extending through the valve body and the valve member, a distal end portion of the pin being inserted into the opening of the valve body from an opposite end of the valve body;
    a staked portion formed by staking the distal end portion of the pin so as to clamp an inner peripheral portion of the valve member to the valve body; and
    at least one ring-shaped restraining member provided between the valve member and the staked portion, the pin extending through the restraining member, the restraining member being adapted to prevent enlargement of a diameter of the pin due to the staking of the distal end of the pin,
    wherein the inner peripheral portion of the valve member and an inner peripheral portion of the restraining member directly face an outer peripheral portion of the pin,
    wherein an inner diameter of the restraining member is smaller than an inner diameter of the valve member, and
    wherein the inner peripheral portion of the valve member is clamped between a clamp portion of the valve body and the restraining member, and an outer peripheral portion of the valve member is arranged to open and close the hydraulic fluid passage of the valve body.

2. The valve apparatus according to claim 1, further comprising:
    at least one ring-shaped washer provided between the restraining member and the valve member, the pin extending through the washer;
    wherein an inner diameter of the washer is larger than the inner diameter of the restraining member.

3. The valve apparatus according to claim 2, wherein the washer is formed of a material softer than that of the restraining member.

4. The valve apparatus according to claim 2, wherein the washer has a first surface and a second surface at opposite ends of the washer in an axial direction of the washer, wherein the first surface and the second surface each extend from a radially innermost edge of the washer to a radially outer edge of the washer, and wherein the first surface and the second surface are both entirely flat.

5. The valve apparatus according to claim 1, further comprising:
    at least one ring-shaped washer provided between the staked portion and the restraining member, the pin extending through the washer;
    wherein an inner diameter of the washer is larger than the inner diameter of the restraining member.

6. The valve apparatus according to claim 5, wherein the washer is formed of a material softer than that of the restraining member.

7. The valve apparatus according to claim 1, wherein the restraining member is press-fitted to the pin.

8. The valve apparatus according to claim 1, wherein the valve member has a check valve comprising a single disk valve.

9. The valve apparatus according to claim 1, further comprising:
a washer and a retainer, the pin extending through the washer and the retainer,
wherein the washer, the retainer and the restraining member are all provided between the valve member and the staked portion.

10. A hydraulic shock absorber comprising:
a cylinder having a hydraulic fluid sealed therein, the cylinder having two opposite ends;
an outer tube surrounding an outer periphery of the cylinder;
a reservoir formed between the cylinder and the outer tube;
a piston slidably fitted in the cylinder;
a piston rod having one end projecting from one end of the cylinder, an opposite end of the piston rod being fixedly secured to the piston;
a valve body provided at the other end of the cylinder so as to divide between an interior of the cylinder and the reservoir, the valve body having
an opening, and
a hydraulic fluid passage spaced apart from the opening, the hydraulic fluid passage communicating between the interior of the cylinder and the reservoir;
at least one disk-shaped valve member provided at one end of the valve body inside the cylinder to selectively open and close the hydraulic fluid passage;
a pin extending through the valve body and the valve member, a distal end portion of the pin being inserted into the opening of the valve body from an opposite end of the valve body;
a staked portion formed by staking the distal end portion of the pin inside the cylinder so as to clamp an inner peripheral portion of the valve member to the valve body; and
at least one ring-shaped restraining member provided between the valve member and the staked portion, the pin extending through the restraining member, the restraining member being adapted to prevent enlargement of a diameter of the pin due to the staking of the distal end of the pin,
wherein the inner peripheral portion of the valve member and an inner peripheral portion of the restraining member directly face an outer peripheral portion of the pin,
wherein an inner diameter of the restraining member is smaller than an inner diameter of the valve member, and
wherein the inner peripheral portion of the valve member is clamped between a clamp portion of the valve body and the restraining member, and an outer peripheral portion of the valve member is arranged to open and close the hydraulic fluid passage of the valve body.

11. The hydraulic shock absorber according to claim 10, further comprising:
at least one ring-shaped washer provided between the restraining member and the valve member, the pin extending through the washer;
wherein an inner diameter of the washer is larger than the inner diameter of the restraining member.

12. The hydraulic shock absorber according to claim 11, wherein the washer is formed of a material softer than that of the restraining member.

13. The hydraulic shock absorber according to claim 11, wherein the washer has a first surface and a second surface at opposite ends of the washer in an axial direction of the washer, wherein the first surface and the second surface each extend from a radially innermost edge of the washer to a radially outer edge of the washer, and wherein the first surface and the second surface are both entirely flat.

14. The hydraulic shock absorber according to claim 10, further comprising:
at least one ring-shaped washer provided between the staked portion and the restraining member, the pin extending through the washer;
wherein an inner diameter of the washer is larger than the inner diameter of the restraining member.

15. The hydraulic shock absorber according to claim 14, wherein the washer is formed of a material softer than that of the restraining member.

16. The hydraulic shock absorber according to claim 10, wherein the restraining member is press-fitted to the pin.

17. The hydraulic shock absorber according to claim 10, wherein the valve member has a check valve comprising a single disk valve.

18. The hydraulic shock absorber according to claim 10, further comprising:
a washer and a retainer, the pin extending through the washer and the retainer,
wherein the washer, the retainer and the restraining member are all provided between the valve member and the staked portion.

* * * * *